United States Patent
Sakata et al.

(10) Patent No.: US 11,181,814 B2
(45) Date of Patent: Nov. 23, 2021

(54) LIGHT SOURCE DEVICE AND PROJECTOR

(71) Applicant: SEIKO EPSON CORPORATION, Tokyo (JP)

(72) Inventors: Hidefumi Sakata, Kamiina-gun (JP); Junichi Suzuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/516,352

(22) Filed: Jul. 19, 2019

(65) Prior Publication Data

US 2020/0026172 A1    Jan. 23, 2020

(30) Foreign Application Priority Data

Jul. 20, 2018  (JP) .............................. JP2018-136770

(51) Int. Cl.
  *G03B 21/20*  (2006.01)
  *G03B 33/12*  (2006.01)
  *G03B 21/00*  (2006.01)

(52) U.S. Cl.
  CPC ....... *G03B 21/204* (2013.01); *G03B 21/2066* (2013.01); *G03B 33/12* (2013.01); *G03B 21/006* (2013.01); *G03B 21/008* (2013.01)

(58) Field of Classification Search
  CPC .. G03B 21/204; G03B 21/2066; G03B 33/12; G03B 21/006; G03B 21/008;
  (Continued)

(56) References Cited

U.S. PATENT DOCUMENTS

2006/0227570 A1 * 10/2006 Rutherford ............ H04N 9/315
                                                          362/612
2007/0280622 A1  12/2007 Rutherford
                                (Continued)

FOREIGN PATENT DOCUMENTS

JP    2008-536266 A    9/2008
JP    2016-157096 A    9/2016
                                (Continued)

OTHER PUBLICATIONS

Hoelen, Christoph et al., "Progress in Extremely High Brightness LED-Based Light Sources", Proceeding of SPIE, (Proceeding of SPIE ISSN 0277-786X vol. 10524), SPIE, US, vol. 10378, pp. 103780N-1-103780N-19, (Sep. 6, 2017).

(Continued)

*Primary Examiner* — Michelle M Iacoletti
*Assistant Examiner* — Danell L Owens
(74) *Attorney, Agent, or Firm* — Oliff PLC

(57) ABSTRACT

A light source device includes a wavelength conversion member including a phosphor, and for converting excitation light into first light, a first light source section for emitting the excitation light, a second light source section for emitting second light, and a color combining element for generating composite light. The wavelength conversion member has first and second end surfaces, and a side surface. The excitation light enters the wavelength conversion member from the side surface, and the first light is emitted from the first end surface. The color combining element has first and second surfaces parallel to each other, and a third surface. The first light emitted from the wavelength conversion member enters the color combining element from the first surface, the second light emitted from the second light source section enters the color combining element from the (Continued)

third surface, and the composite light is emitted from the second surface.

18 Claims, 6 Drawing Sheets

(58) Field of Classification Search
CPC .............. G03B 21/208; G03B 21/2033; G03B 21/2013; G02B 6/0003; G02B 27/0994; H04N 9/3152; H04N 9/3161; H04N 9/3158
See application file for complete search history.

(56) References Cited

U.S. PATENT DOCUMENTS

| | | | |
|---|---|---|---|
| 2009/0078949 A1 | 3/2009 | Bechtel et al. | |
| 2011/0116261 A1 | 5/2011 | Brukilacchio et al. | |
| 2017/0013240 A1* | 1/2017 | Chikahisa | G02B 5/3083 |
| 2018/0024425 A1 | 1/2018 | Fujita et al. | |
| 2018/0106460 A1 | 4/2018 | Van Bommel et al. | |
| 2019/0268578 A1* | 8/2019 | Koizumi | H04N 9/3167 |
| 2020/0041885 A1* | 2/2020 | Peeters | F21S 41/19 |

FOREIGN PATENT DOCUMENTS

| | | |
|---|---|---|
| JP | 2017-9981 A | 1/2017 |
| WO | 2006/054203 A1 | 5/2006 |
| WO | 2006/104907 A1 | 10/2006 |
| WO | 2016/132706 A1 | 8/2016 |
| WO | 2016-162233 A1 | 10/2016 |
| WO | 2017/102439 A1 | 6/2017 |

OTHER PUBLICATIONS

Dec. 19, 2019 Extended Search Report issued in European Patent Application No. 19186996.5.

* cited by examiner

LIGHT SOURCE DEVICE AND PROJECTOR

The present application is based on, and claims priority from JP Application Serial Number 2018-136770, filed Jul. 20, 2018, the disclosure of which is hereby incorporated by reference herein in its entirety.

BACKGROUND

1. Technical Field

The present disclosure relates to a light source device and a projector.

2. Related Art

As a light source device used for a projector, there is proposed a light source device using fluorescence emitted from a phosphor when irradiating the phosphor with excitation light emitted from a light emitting element. In International Publication No. WO 2006/054203 (Document 1), there is disclosed a light source device which is provided with a wavelength conversion member shaped like a flat plate, and a light emitting diode (LED) for emitting excitation light, and has a configuration of making the excitation light enter the wavelength conversion member from a surface large in area, and emitting the converted light from a surface small in area of the wavelength conversion member.

As described in Document 1, by making the light emitted from the LED enter the wavelength conversion member, it is possible to obtain light different in wavelength from the light emitted from the LED. For example, when the wavelength conversion member includes a yellow phosphor, it is possible to obtain yellow light from blue light emitted from the LED. However, in order to obtain white light necessary for a light source device for a projector, it is necessary to separately provide a light source for emitting the blue light, and an optical system such as a color combining element for combining the blue light and the yellow light with each other in addition to the light source device of Document 1. As a result, there is a problem that the light source device grows in size. Further, also when obtaining colored light other than the white light, there is a problem that the light source device grows in size due to the optical system for combining the fluorescence and other colored light with each other.

SUMMARY

A light source device according to an aspect of the present disclosure includes a wavelength conversion member including at least a phosphor, and converting excitation light in an excitation wavelength band into first light in a first wavelength band different from the excitation wavelength band, a first light source section configured to emit the excitation light, a second light source section configured to emit second light in a second wavelength band different from the first wavelength band, and a color combining element configured to combine the first light and the second light with each other to form composite light and emit the composite light. The wavelength conversion member has a first end surface and a second end surface opposed to each other, and a side surface crossing the first end surface and the second end surface. The excitation light enters the wavelength conversion member from the side surface, and the first light is emitted from the first end surface. The light combining element has a first surface and a second surface opposed to each other, and a third surface crossing the first surface and the second surface. The first light emitted from the wavelength conversion member enters the color combining element from the first surface, the second light emitted from the second light source section enters the color combining element from the third surface, and the composite light is emitted from the second surface.

In the light source device according to the aspect of the present disclosure, the first light may be yellow light, and the second light may be blue light.

The light source device according to the aspect of the present disclosure may further include an angle conversion element which is disposed at a light exit side of the wavelength conversion member, which includes an end plane of incidence of light and a light exit end surface, and which makes a diffusion angle in the light exit end surface smaller than a diffusion angle in the end plane of incidence of light.

In the light source device according to the aspect of the present disclosure, the color combining element may be disposed at the light exit side of the wavelength conversion member, and the angle conversion element may be disposed at a light exit side of the color combining element.

In the light source device according to the aspect of the present disclosure, the color combining element may be fixed to the wavelength conversion member.

In the light source device according to the aspect of the present disclosure, the angle conversion element may be disposed at the light exit side of the wavelength conversion member, and the color combining element may be disposed at a light exit side of the angle conversion element.

In the light source device according to the aspect of the present disclosure, the color combining element may be fixed to the angle conversion element.

In the light source device according to the aspect of the present disclosure, the color combining element may have an angle conversion function of making a diffusion angle in the second surface smaller than a diffusion angle in the first surface.

The light source device according to the aspect of the present disclosure may further include a mirror provided to the second end surface of the wavelength conversion member, and configured to reflect the first light.

The light source device according to the aspect of the present disclosure may further include a second dichroic mirror provided to the side surface of the wavelength conversion member, and configured to transmit the excitation light and reflect the first light.

The light source device according to the aspect of the present disclosure may further include a first dichroic mirror disposed between the first end surface of the wavelength conversion member and the first surface of the color combining element, and configured to transmit the first light and reflect the excitation light.

In the light source device according to the aspect of the present disclosure, a dimension of the wavelength conversion member in a normal direction of the first end surface may be longer than a dimension of the wavelength conversion member in a normal direction of the side surface.

In the light source device according to the aspect of the present disclosure, the first light source section may include a light emitting diode.

In the light source device according to the aspect of the present disclosure, the first light source section may be disposed at a position opposed to the side surface of the wavelength conversion member.

In the light source device according to the aspect of the present disclosure, the second light source section may include a semiconductor laser, a diffusing plate and a condenser lens.

A projector according to another aspect of the present disclosure includes the light source device according to any one of the above aspects of the present disclosure, a light modulation device configured to modulate light from the light source device in accordance with image information, and a projection optical device configured to project the light modulated by the light modulation device.

DESCRIPTION OF EXEMPLARY EMBODIMENTS

First Embodiment

Hereinafter, a first embodiment of the present disclosure will be described using FIG. 1 and FIG. 2.

A projector according to the present embodiment is an example of a projector using liquid crystal panels as light modulation devices.

It should be noted that in each of the drawings described below, the constituents are shown with the scale ratios of respective sizes set differently between the constituents in some cases in order to facilitate the visualization of each of the constituents.

The projector 1 according to the present embodiment is a projection-type image display device for displaying a color image on a screen (a projection target surface) SCR. The projector 1 uses three light modulation devices corresponding to respective colored light, namely red light LR, green light LG and blue light LB.

Figure 1:
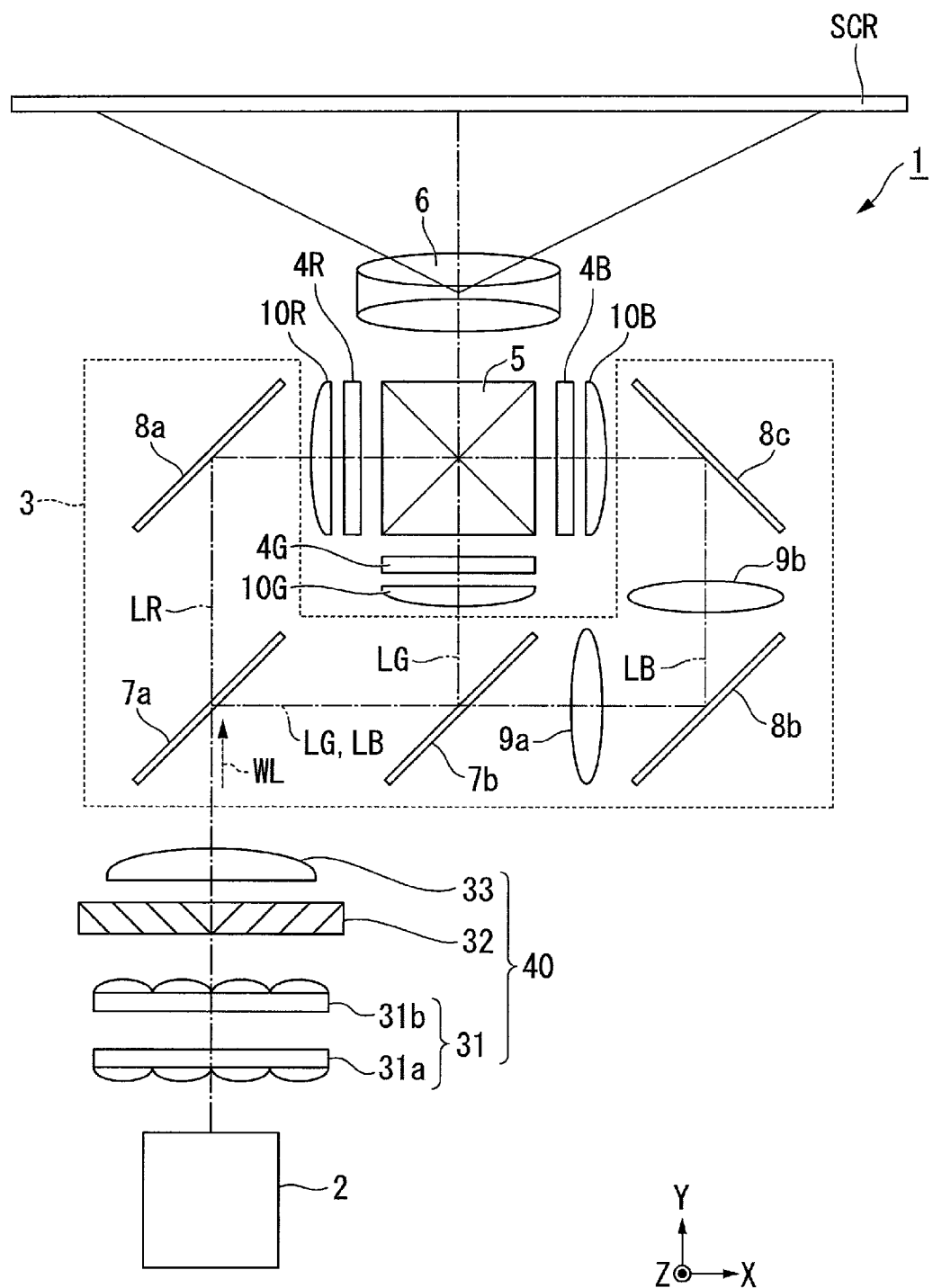
FIG. 1 is a schematic configuration diagram of a projector according to a first embodiment.

As shown in FIG. 1, the projector 1 is provided with a light source device 2, a homogenous illumination optical system 40, a color separation optical system 3, a light modulation device 4R, a light modulation device 4G, a light modulation device 4B, a combining optical system 5 and a projection optical device 6.

The light source device 2 emits illumination light WL toward the homogenous illumination optical system 40. The detailed configuration of the light source device 2 will be described later in detail.

The homogenous illumination optical system 40 is provided with an integrator optical system 31, a polarization conversion element 32 and a superimposing optical system 33. The integrator optical system 31 is provided with a first lens array 31a and a second lens array 31b. The homogenous illumination optical system 40 homogenizes the intensity distribution of the illumination light WL emitted from the light source device 2 in each of the light modulation device 4R, the light modulation device 4G and the light modulation device 4B as illumination target areas. The illumination light WL having been emitted from the homogenous illumination optical system 40 enters the color separation optical system 3.

The color separation optical system 3 separates the illumination light WL as white light into the red light LR, the green light LG and the blue light LB. The color separation optical system 3 is provided with a first dichroic mirror 7a, a second dichroic mirror 7b, a first reflecting mirror 8a, a second reflecting mirror 8b, a third reflecting mirror 8c, a first relay lens 9a and a second relay lens 9b.

The first dichroic mirror 7a separates the illumination light WL from the light source device 2 into the red light LR and the other light (the green light LG and the blue light LB). The first dichroic mirror 7a transmits the red light LR thus separated from, and at the same time reflects the other light (the green light LG and the blue light LB). Meanwhile, the second dichroic mirror 7b separates the other light into the green light LG and the blue light LB. The second dichroic mirror 7b reflects the green light LG thus separated from and transmits the blue light LB.

The first reflecting mirror 8a is disposed in the light path of the red light LR, and reflects the red light LR, which has been transmitted through the first dichroic mirror 7a, toward the light modulation device 4R. Meanwhile, the second reflecting mirror 8b and the third reflecting mirror 8c are disposed in the light path of the blue light LB, and reflect the blue light LB, which has been transmitted through the second dichroic mirror 7b, toward the light modulation device 4B. Further, the green light LG is reflected by the second dichroic mirror 7b toward the light modulation device 4G.

The first relay lens 9a and the second relay lens 9b are disposed at the light exit side of the second dichroic mirror 7b in the light path of the blue light LB. The first relay lens 9a and the second relay lens 9b correct a difference in illuminance distribution of the blue light LB due to the fact that the blue light LB is longer in optical path length than the red light LR and the green light LG.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G and the light modulation device 4B, there are used, for example, transmissive liquid crystal panels. Further, at the incident side and the exit side of the liquid crystal panel, there are disposed polarization plates (not shown), respectively, and thus, there is formed a configuration of transmitting only the linearly polarized light with a specific direction.

On the incident side of the light modulation device 4R, the light modulation device 4G and the light modulation device 4B, there are disposed a field lens 10R, a field lens 10G and a field lens 10B, respectively. The field lens 10R, the field lens 10G and the field lens 10B collimate principal rays of the red light LR, the green light LG and the blue light LB entering the light modulation device 4R, the light modulation device 4G and the light modulation device 4B, respectively.

The combining optical system 5 combines the image light corresponding to the red light LR, the image light corresponding to the green light LG and the image light corresponding to the blue light LB with each other in response to incidence of the image light respectively emitted from the light modulation device 4R, the light modulation device 4G and the light modulation device 4B, and then emits the image light thus combined toward the projection optical device 6. As the combining optical system 5, there is used, for example, a cross dichroic prism.

The projection optical device 6 is constituted by a plurality of projection lenses. The projection optical device 6 projects the image light having been combined by the combining optical system 5 toward the screen SCR in an enlarged manner. Thus, an image is displayed on the screen SCR.

The light source device 2 will hereinafter be described.

Figure 2:
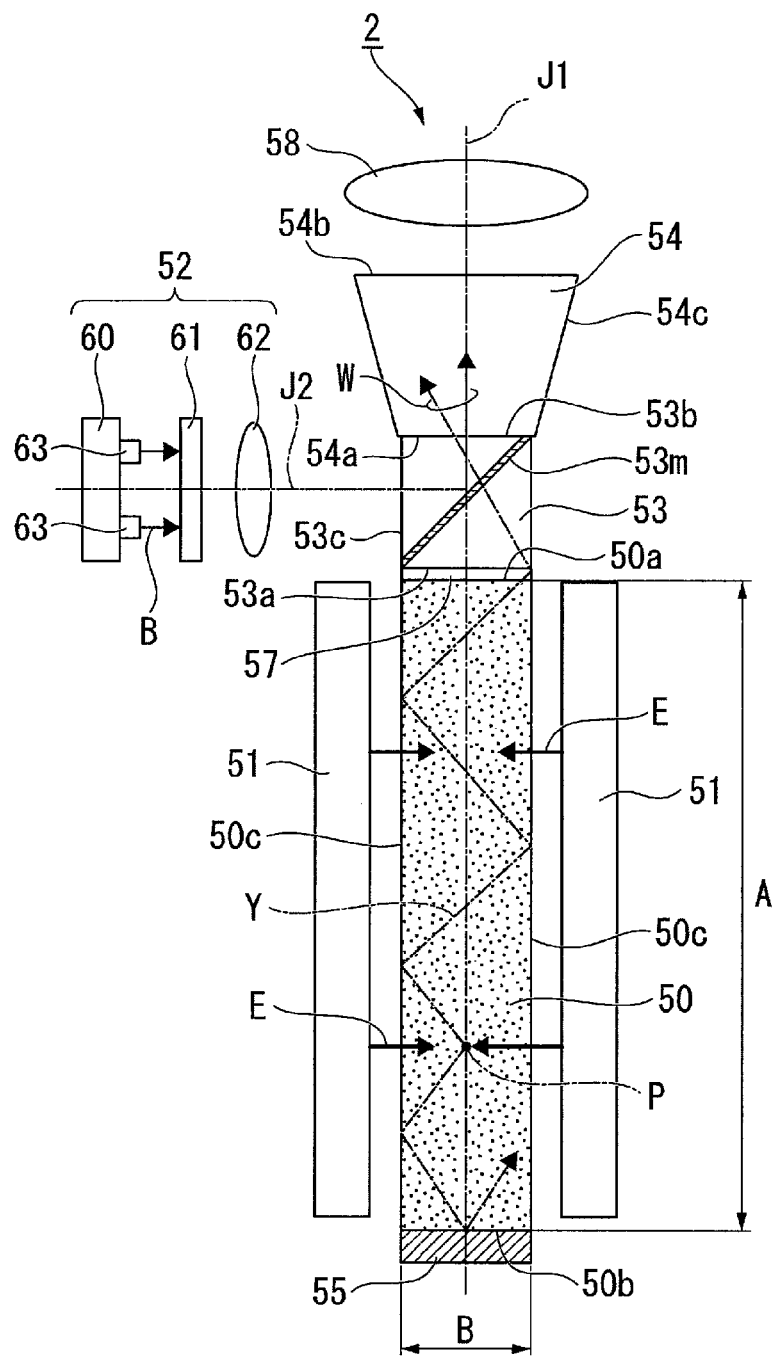
FIG. 2 is a schematic configuration diagram of a light source device according to the first embodiment.

FIG. 2 is a schematic configuration diagram of the light source device 2.

As shown in FIG. 2, the light source device 2 is provided with a wavelength conversion member 50, a first light source section 51, a color combining element 53, a second light source section 52, an angle conversion element 54, a mirror 55, a first dichroic mirror 57 and a collimator lens 58.

The wavelength conversion member 50 has a quadrangular prismatic shape, and has a first end surface 50a and a second end surface 50b opposed to each other, and four side surfaces 50c crossing the first end surface 50a and the second end surface 50b. The wavelength conversion member 50 includes at least a phosphor, and converts excitation light E in an excitation wavelength band into fluorescence Y (first light) in a first wavelength band different from the excitation wavelength band. In the wavelength conversion member 50, the excitation light E enters the side surface 50c, and the fluorescence Y is emitted from the first end surface 50a.

The length A of the wavelength conversion member 50 in a normal direction of the first end surface 50a is longer than the length B of the wavelength conversion member 50 in a normal direction of the side surface 50c. For example, the length A is roughly ten through several tens times as large as the length B. It should be noted that the wavelength conversion member 50 is not necessarily required to have the quadrangular prismatic shape, but can also have other polygonal shapes such as a triangular prismatic shape. Alternatively, it is also possible for the wavelength conversion member 50 to have a columnar shape. When the wavelength conversion member 50 has a columnar shape, the wavelength conversion member 50 has a first end surface 50a and a second end surface 50b parallel to each other, and a side surface 50c perpendicular to the first end surface 50a and the second end surface 50b.

The wavelength conversion member 50 includes a ceramic phosphor (polycrystalline phosphor) for performing the wavelength conversion on the excitation light E to generate the fluorescence Y in the first wavelength band. The first wavelength band is a yellow wavelength band of, for example, 490 through 750 nm. Therefore, the fluorescence Y is yellow fluorescence including a red light component and a green light component. It is also possible for the wavelength conversion member 50 to include a single-crystal phosphor instead of the polycrystalline phosphor. Alternatively, the wavelength conversion member 50 can also be formed of fluorescent glass. Alternatively, the wavelength conversion member 50 can also be formed of a material obtained by dispersing a number of phosphor particles in a binder made of glass or resin. The wavelength conversion member 50 made of such a material converts the excitation light E into the fluorescence Y in the first wavelength band.

Specifically, the material of the wavelength conversion member 50 includes, for example, an yttrium aluminum garnet (YAG) phosphor. Citing YAG:Ce including cerium (Ce) as an activator agent as an example, as the material of the wavelength conversion member 50, there can be used a material obtained by mixing raw powder including constituent elements such as $Y_2O_3$, $Al_2O_3$ and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process or a thermal plasma process.

The first light source section 51 has an LED for emitting the blue excitation light E. The first light source section 51 is disposed so as to be opposed to the side surfaces 50c of the wavelength conversion member 50, and emits the excitation light E toward the side surfaces 50c. The excitation wavelength band is a blue wavelength band of, for example, 400 nm through 480 nm, and the peak wavelength is, for example, 445 nm. In other words, the excitation light E is blue light. The first light source section 51 can be disposed so as to be opposed to some side surfaces 50c out of the four side surfaces 50c of the wavelength conversion member 50, or can also be disposed so as to be opposed to all of the side surfaces 50c.

The first light source section 51 has the LED for emitting the blue excitation light E, but can also be provided with other optical members such as a light guide plate, a diffusing plate or a lens beside the LED. The number of the LED is not particularly limited.

The color combining element 53 is disposed at the light exit side of the first end surface 50a of the wavelength conversion member 50. The color combining element 53 is formed of a dichroic prism having a dichroic mirror 53m disposed inside. The color combining element 53 has a rectangular solid shape, and has a first surface 53a and a second surface 53b parallel to each other, and third surfaces 53c perpendicular to the first surface 53a and the second surface 53b. The dichroic mirror 53m has a property of transmitting the fluorescence Y emitted from the wavelength conversion member 50, and reflecting blue light B emitted from the second light source section 52 described later. Thus, the color combining element 53 generates white composite light W obtained by combining the fluorescence Y and the blue light B with each other.

The color combining element 53 is fixed to the wavelength conversion member 50 with an optical adhesive (not shown) so that the first surface 53a is opposed to the first end surface 50a. Specifically, the color combining element 53 and the wavelength conversion member 50 have contact with each other via the optical adhesive, and no air gap (no air layer) exists between the color combining element 53 and the wavelength conversion member 50. If an air gap is disposed between the color combining element 53 and the wavelength conversion member 50, an incident part with an incident angle no smaller than the critical angle out of the fluorescence Y having reached the first end surface 50a of the wavelength conversion member 50 is totally reflected by the first end surface 50a, and fails to enter the color combining element 53. In contrast, when such an air gap is not disposed between the color combining element 53 and the wavelength conversion member 50, it is possible to reduce the fluorescence Y which fails to enter the color combining element 53. From this point of view, it is desirable to make the refractive index of the color combining element 53 and the refractive index of the wavelength conversion member 50 coincide with each other as precisely as possible.

The fluorescence Y having been emitted from the wavelength conversion member 50 enters the color combining element 53 from the first surface 53a. Further, the blue light B having been emitted from the second light source section 52 enters the color combining element 53 from the third surface 53c. Then, the fluorescence Y and the blue light B are combined with each other in the color combining element 53, and the composite light W generated by the combination is emitted from the second surface 53b.

It should be noted that the color combining element 53 is not necessarily required to be fixed to the wavelength conversion member 50 with the optical adhesive. It is possible for the color combining element 53 to be fixed with, for example, an arbitrary support member so as to have direct contact with the wavelength conversion member 50. In any case, it is desirable not to provide an air gap between the color combining element 53 and the wavelength conversion member 50.

The second light source section 52 has a semiconductor laser array 60 including a plurality of semiconductor lasers 63, a diffusing plate 61 and a condenser lens 62. When defining a central axis passing through the centers of the first end surface 50a and the second end surfaces 50b of the wavelength conversion member 50 as an optical axis J1 of the wavelength conversion member 50, an axis which is perpendicular to the optical axis J1 of the wavelength conversion member 50, and which passes through the center of the color combining element 53 is defined as an optical axis J2 of the second light source section 52. The semiconductor laser array 60, the diffusing plate 61 and the condenser lens 62 are arranged on the optical axis J2 in this order from a far side to a near side with respect to the color combining element 53.

The semiconductor laser array 60 has a configuration in which the plurality of semiconductor lasers 63 is arranged in an array viewed from a direction of the optical axis J2 of the second light source section 52. Each of the semiconductor lasers 63 emits the blue light B (second light) in a second wavelength band different from the first wavelength band of the fluorescence Y toward the diffusing plate 61. The second wavelength band is a blue wavelength band of, for example, 440 nm through 480 nm. It should be noted that it is also possible for the second light source section 52 to have one semiconductor laser 63 instead of the semiconductor laser array 60.

The diffusing plate 61 is disposed at a light exit side of the semiconductor laser array 60. The diffusing plate 61 diffuses the blue light B emitted from the semiconductor laser array 60. The diffusing plate 61 is constituted by, for example, a microlens array, a holographic diffuser, a ground glass having a surface provided with asperity or a fly-eye lens formed of two microlens arrays. A diffusion angle distribution of the blue light B having been transmitted through the diffusing plate 61 becomes broader than the diffusion angle distribution of the blue light B which has not been transmitted through the diffusing plate 61. Thus, it is possible to increase the diffusion angle of the blue light B to an equivalent level to the diffusion angle of the fluorescence Y. As a result, it is possible to suppress the color unevenness of the composite light W due to the fact that the diffusion angle of the blue light B and the diffusion angle of the fluorescence Y are different from each other.

The condenser lens 62 is disposed at a light exit side of the diffusing plate 61. The condenser lens 62 converges the blue light B emitted from the diffusing plate 61 toward the color combining element 53. The condenser lens 62 is formed of a convex lens.

The angle conversion element 54 is disposed at a light exit side of the second surface 53b of the color combining element 53. The angle conversion element 54 is formed of a taper rod having an end plane of incidence of light 54a which the composite light W enters, and a light exit end surface 54b from which the composite light W is emitted. The angle conversion element 54 has a truncated quadrangular pyramid shape, and the cross-sectional area perpendicular to the optical axis J1 increases along the proceeding direction of the light, and the area of the light exit end surface 54b is larger than the area of the end plane of incidence of light 54a. Thus, the composite light W changes the angle to a direction parallel to the optical axis J1 every time the composite light W is totally reflected by side surfaces 54c while proceeding inside the angle conversion element 54. In such a manner, the angle conversion element 54 makes the diffusion angle of the composite light W in the light exit end surface 54b smaller than the diffusion angle of the composite light W in the end plane of incidence of light 54a.

The angle conversion element 54 is fixed to the color combining element 53 with an optical adhesive (not shown) so that the end plane of incidence of light 54a is opposed to the second end surface 53b of the color combining element 53. Specifically, the angle conversion element 54 and the color combining element 53 have contact with each other via the optical adhesive, and no air gap (no air layer) is disposed between the angle conversion element 54 and the color combining element 53. It should be noted that the angle conversion element 54 can also be fixed so as to have direct contact with the color combining element 53 by, for example, an arbitrary support member. In any case, it is desirable not to provide an air gap between the angle conversion element 54 and the color combining element 53. Also in this case, similarly to the relationship between the wavelength conversion member 50 and the color combining element 53 described above, it is desirable to make the refractive index of the angle conversion element 54 and the refractive index of the color combining element 53 coincide with each other an precisely as possible.

It should be noted that it is also possible to use a compound parabolic concentrator (CPC) as the angle conversion element 54. When using the CPC as the angle conversion element 54, it is also possible to obtain substantially the same advantages as those when using the taper rod.

The mirror 55 is provided to the second end surface 50b of the wavelength conversion member 50. The mirror 55 reflects the fluorescence Y which has been guided inside the wavelength conversion member 50, and has reached the second end surface 50b. The mirror 55 is formed of a metal film or a dielectric multilayer film formed above the second end surface 50b of the wavelength conversion member 50.

The first dichroic mirror 57 is disposed between the first end surface 50a of the wavelength conversion member 50 and the first surface 53a of the color combining element 53. The first dichroic mirror 57 transmits the fluorescence Y generated inside the wavelength conversion member 50, and at the same time, reflects the excitation light E having been emitted from the first light source section 51. The first dichroic mirror 57 is formed of a dielectric multilayer film formed above the first end surface 50a of the wavelength conversion member 50 or the first surface 53a of the color combining element 53.

The collimator lens 58 is disposed at the light exit side of the light exit end surface 54b of the angle conversion element 54. The collimator lens 58 collimates the composite light W emitted from the angle conversion element 54. Therefore, parallelism of the composite light W the angle distribution of which is converted by the angle conversion element 54 is further improved by the collimator lens 58. The collimator lens 58 is formed of a convex lens. It should be noted that when sufficient parallelism is obtained by the angle conversion element 54 alone, it is not necessarily required to provide the collimator lens 58.

In the light source device 2 having the configuration described above, when the excitation light E emitted from the first light source section 51 enters the wavelength conversion member 50, the phosphor included in the wavelength conversion member 50 is excited, and the fluorescence Y is emitted from an arbitrary light emitting point P. The fluorescence Y proceeds from the arbitrary light emitting point P toward all directions, but the fluorescence Y having proceeded toward the side surface 50c is totally reflected by the side surface 50c, and proceeds toward the first end surface 50a or the second end surface 50b while repeating the total reflection. The fluorescence Y having proceeded toward the first end surface 50a is transmitted through the first dichroic mirror 57, and then enters the color combining element 53. Meanwhile, the fluorescence Y having proceeded toward the second end surface 50b is reflected by the mirror 55, and then proceeds toward the first end surface 50a.

The excitation light E which has not been used for the excitation of the phosphor out of the excitation light E having entered the wavelength conversion member 50 is reflected by the first dichroic mirror 57 provided to the first end surface 50a and the mirror 55 provided to the second end surface 50b, and is therefore confined inside the wavelength conversion member 50 and thus reused.

The fluorescence Y having entered the color combining element 53 from the first surface 53a is transmitted through the dichroic mirror 53m. Meanwhile, the blue light B having entered the color combining element 53 from the third surface 53c is reflected by the dichroic mirror 53m. As a result, the white composite light W consisting of the yellow fluorescence Y and the blue light B combined with each other is emitted from the second surface 53b of the color combining element 53. The composite light W having been emitted from the color combining element 53 is collimated by the angle conversion element 54 and the collimator lens 58, and is then emitted from the light source device 2. The composite light W (the illumination light WL) having been emitted from the light source device 2 proceeds toward the integrator optical system 31 as shown in FIG. 1.

In the light source device 2 according to the present embodiment, since the first light source section 51 for emitting the excitation light E is disposed so as to be opposed to the side surfaces 50c of the wavelength conversion member 50, and the color combining element 53 for combining the blue light from the second light source section 52 and the fluorescence Y from the wavelength conversion member 50 with each other is bonded to the wavelength conversion member 50 so as to be integrated with the wavelength conversion member 50, the light source device 2 from which the white light can be obtained can be realized with a compact configuration.

In general, the light emitted from the LED is larger in diffusion angle compared to the light emitted form the semiconductor laser. Therefore, the light source using the LED is large in etendue determined by the product of the light emitting area of the light source and the solid angle of the light from the light source compared to the light source using the semiconductor laser. The increase in etendue of the light source device increases the light which cannot be taken by the optical system in the posterior stage of the light source device to cause deterioration of the light use efficiency as the projector. Therefore, when used as the light source device for the projector, it is desirable for the etendue to be as small as possible.

From that point of view, in the case of the present embodiment, the first light source section 51 is formed of the LED, and the excitation light E large in diffusion angle and emitted from the LED enters the wavelength conversion member 50 from the side surfaces 50c large in area. Meanwhile, the fluorescence Y generated inside the wavelength conversion member 50 is emitted from the first end surface 50a sufficiently smaller in area compared to the side surfaces 50c. Since the substantive light emission area of the wavelength conversion member 50 corresponds to the area of the first end surface 50a, the light emission area is equivalently contracted due to the configuration of the present embodiment. As described above, according to the present embodiment, it is possible to realize the light source device 2 small in etendue, and by using this light source device 2 in the projector 1, the light use efficiency can be improved.

In the case of the present embodiment, since the yellow fluorescence Y is emitted from the wavelength conversion member 50, the blue light B is emitted from the second light source section 52, and the white light can be obtained by combining the fluorescence Y and the blue light B with each other, it is possible to adjust the white balance of the white light by adjusting the balance between the light intensity of the fluorescence Y and the light intensity of the blue light B. As a specific adjustment method of the white balance, it is also possible to adopt a configuration in which, for example, the light source device 2 is provided with sensors for detecting the intensity of the fluorescence and the intensity of the blue light, respectively, and the electrical power to be supplied to the first light source section 51 or the second light source section 52 is appropriately controlled in accordance with the deviation of each of the light intensities detected by the sensors from a standard value.

In the light source device 2 according to the present embodiment, since the angle conversion element 54 is disposed at the light exit side of the color combining element 53, it is possible to collimate the composite light W emitted from the color combining element 53. Further, since the collimator lens 58 is disposed at the light exit side of the angle conversion element 54, it is possible to further improve the parallelism of the composite light W. Thus, it is possible to improve the light use efficiency in the optical system in the posterior stage of the light source device 2. Further, by disposing the wavelength conversion member 50, the color combining element 53 and the angle conversion element 54 in this order along the proceeding direction of the fluorescence Y, it is possible to dispose the constituent such as the second light source section 52 closer to the center of the light source device 2, and thus, it is possible to realize a compact configuration.

In the light source device 2 according to the present embodiment, since the mirror 55 is provided to the second end surface 50b of the wavelength conversion member 50, the fluorescence Y emitted inside the wavelength conversion member 50 is prevented from being emitted from the second end surface 50b. Further, the excitation light E which has not been used for the excitation of the phosphor is also prevented from being leaked outside the wavelength conversion member 50 from the second end surface 50b. Thus, the use efficiency of the fluorescence Y and the excitation light E can be improved.

In the light source device 2 according to the present embodiment, since the first dichroic mirror 57 is disposed between the wavelength conversion member 50 and the color combining element 53, the excitation light E having entered the inside of the wavelength conversion member 50 is prevented from being leaked from the first end surface 50a. Thus, the use efficiency of the excitation light E can be improved.

In the present embodiment, since the second light source section 52 is provided with the semiconductor laser array 60, the diffusing plate 61 and the condenser lens 62, it is possible to realize the light source device 2 which is compact in size, and which is small in color unevenness of the white composite light W when combining the blue light B and the fluorescence Y with each other.

The projector 1 according to the present embodiment is equipped with the light source device 2 described above, and is therefore excellent in light use efficiency, and at the same time, reduction in size can be achieved.

Modified Example

In the light source device according to the present embodiment, it is also possible to provide dichroic mirrors to the side surfaces 50c of the wavelength conversion member 50.

Figure 3:
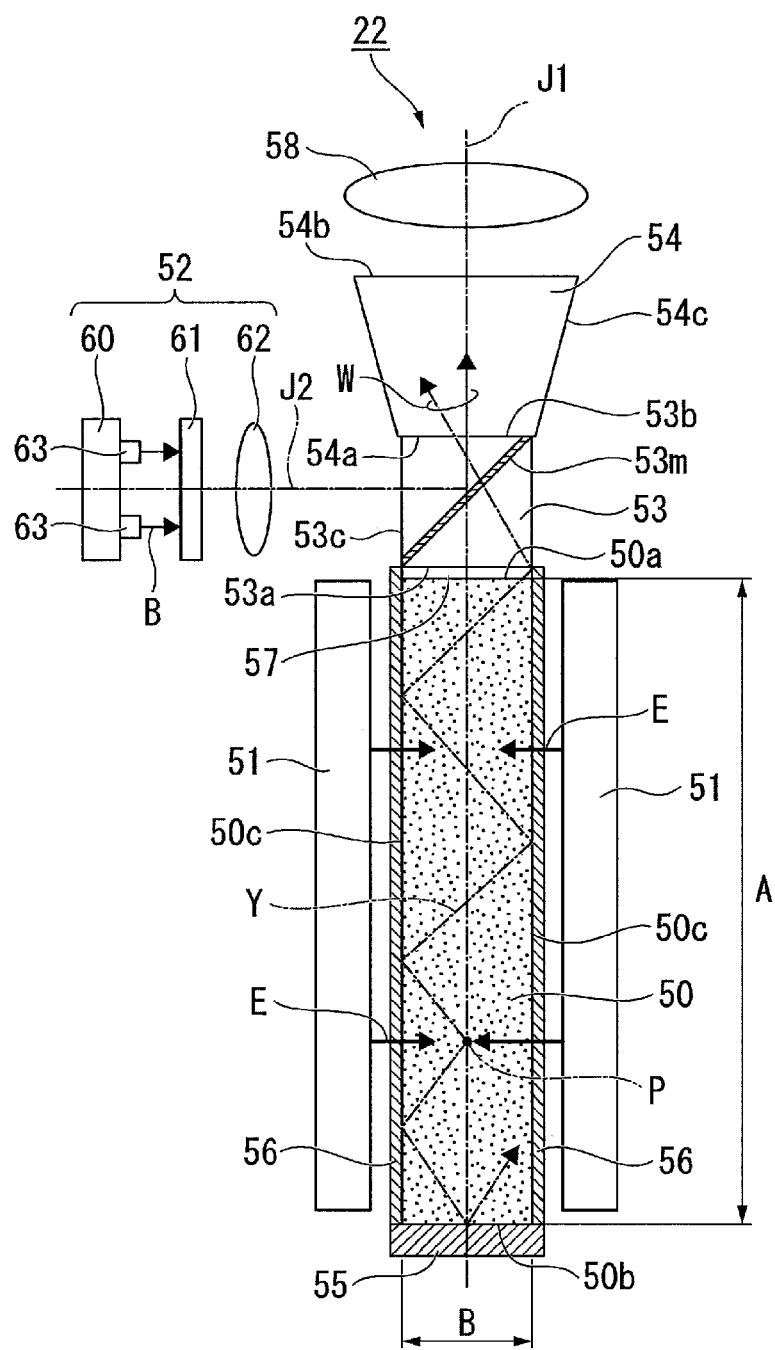
FIG. 3 is a schematic configuration diagram of a light source device according to a modified example of the first embodiment.

FIG. 3 is a schematic configuration diagram of a light source device 22 according to a modified example of the first embodiment.

In FIG. 3, the constituents common to those shown in FIG. 2 are denoted by the same reference numerals, and the description thereof will be omitted.

As shown in FIG. 3, the light source device 22 according to the modified example is further provided with second dichroic mirrors 56 disposed at the side surfaces 50c of the wavelength conversion member 50. The second dichroic mirrors 56 are respectively provided to the four side surfaces 50c of the wavelength conversion member 50. The second dichroic mirrors 56 each transmit the excitation light E having been emitted from the first light source section 51, and at the same time, reflect the fluorescence Y generated inside the wavelength conversion member 50. The second dichroic mirrors 56 are each formed a dielectric multilayer film formed above each of the side surfaces 50c of the wavelength conversion member 50.

In the light source device 2 according to the present embodiment, since the second dichroic mirrors 56 are provided to the side surfaces 50c of the wavelength conversion member 50, the excitation light E enters the wavelength conversion member 50 without a hindrance, and the fluorescence Y emitted inside the wavelength conversion member 50 is prevented from being emitted from the side surfaces 50c. Thus, it is possible to improve the wavelength conversion efficiency.

Second Embodiment

Hereinafter, a second embodiment of the present disclosure will be described using FIG. 4.

A light source device according to the second embodiment is substantially the same in basic configuration as that of the first embodiment, but is different in the positional relationship between the color combining element and the angle conversion element from that of the first embodiment. Therefore, the description of the overall configuration of the light source device will be omitted.

Figure 4:
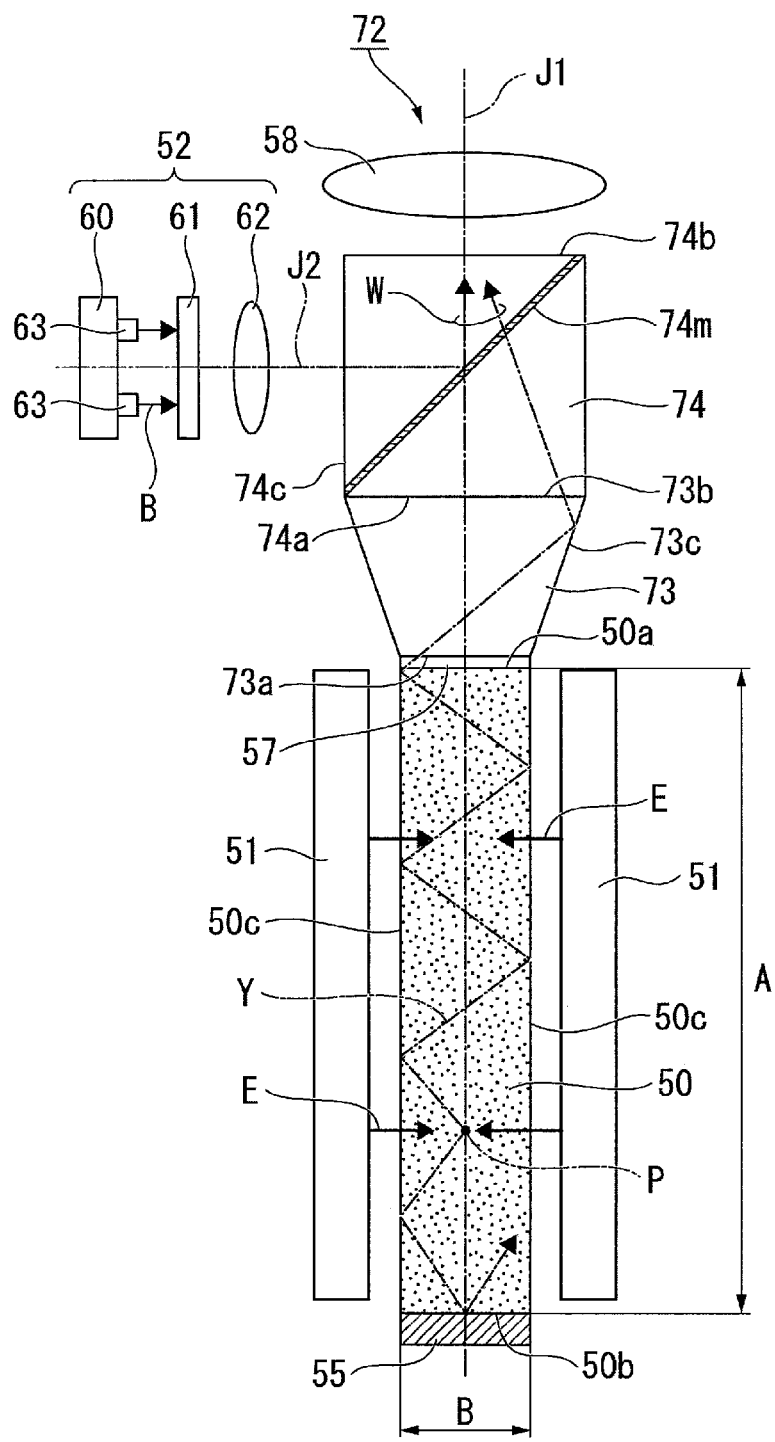
FIG. 4 is a schematic configuration diagram of a light source device according to a second embodiment.

FIG. 4 is a schematic configuration diagram of the light source device 72 according to the second embodiment.

In FIG. 4, the constituents common to those shown in FIG. 2 are denoted by the same reference numerals, and the description thereof will be omitted.

As shown in FIG. 4, the light source device 72 is provided with the wavelength conversion member 50, the first light source section 51, an angle conversion element 73, a color combining element 74, the second light source section 52, the mirror 55, the first dichroic mirror 57 and the collimator lens 58.

In the light source device 72 according to the second embodiment, the angle conversion element 73 has an end plane of incidence of light 73a, a light exit end surface 73b and side surfaces 73c. The angle conversion element 73 is fixed to the wavelength conversion member 50 with an optical adhesive (not shown) so that the end plane of incidence of light 73a is opposed to the first end surface 50a of the wavelength conversion member 50. In other words, the angle conversion element 73 is disposed at the light exit side of the wavelength conversion member 50.

The color combining element 74 has a first surface 74a and a second surface 74b parallel to each other, third surfaces 74c perpendicular to the first surface 74a and the second surface 74b and a dichroic mirror 74m. The color combining element 74 is fixed to the angle conversion element 73 with an optical adhesive (not shown) so that the first surface 74a is opposed to the light exit end surface 73b of the angle conversion element 73. In other words, the color combining element 74 is disposed at the light exit side of the angle conversion element 73. The collimator lens 58 is disposed at the light exit side of the color combining element 74. The rest of the configuration of the light source device 72 is substantially the same as in the first embodiment.

Also in the second embodiment, it is possible to obtain substantially the same advantages as in the first embodiment such as the advantage that it is possible to realize the light source device 72 with which the white light can be obtained with a compact configuration, and the advantage that it is possible to realize the light source device 72 small in etendue.

In the light source device 72 according to the second embodiment, since the angle conversion element 73 is disposed in the anterior stage of the color combining element 74, the fluorescence Y having been emitted from the wavelength conversion member 50 is collimated by the angle conversion element 73, and is further collimated by the collimator lens 58. Further, the blue light B having been emitted from the second light source section 52 is collimated by the collimator lens 58 without being collimated by the angle conversion element 73. The second embodiment is different in this point from the first embodiment. The color combining element 74 is disposed in the posterior stage of the angle conversion element 73, and therefore becomes larger compared to the color combining element 53 of the first embodiment, but the color combining element 74 becomes easy to manufacture.

Third Embodiment

A third embodiment of the present disclosure will hereinafter be described using FIG. 5.

A light source device according to the third embodiment is substantially the same in basic configuration as that of the first embodiment, but is different in the configuration of the color combining element from that of the first embodiment. Therefore, the description of the overall configuration of the light source device will be omitted.

Figure 5:
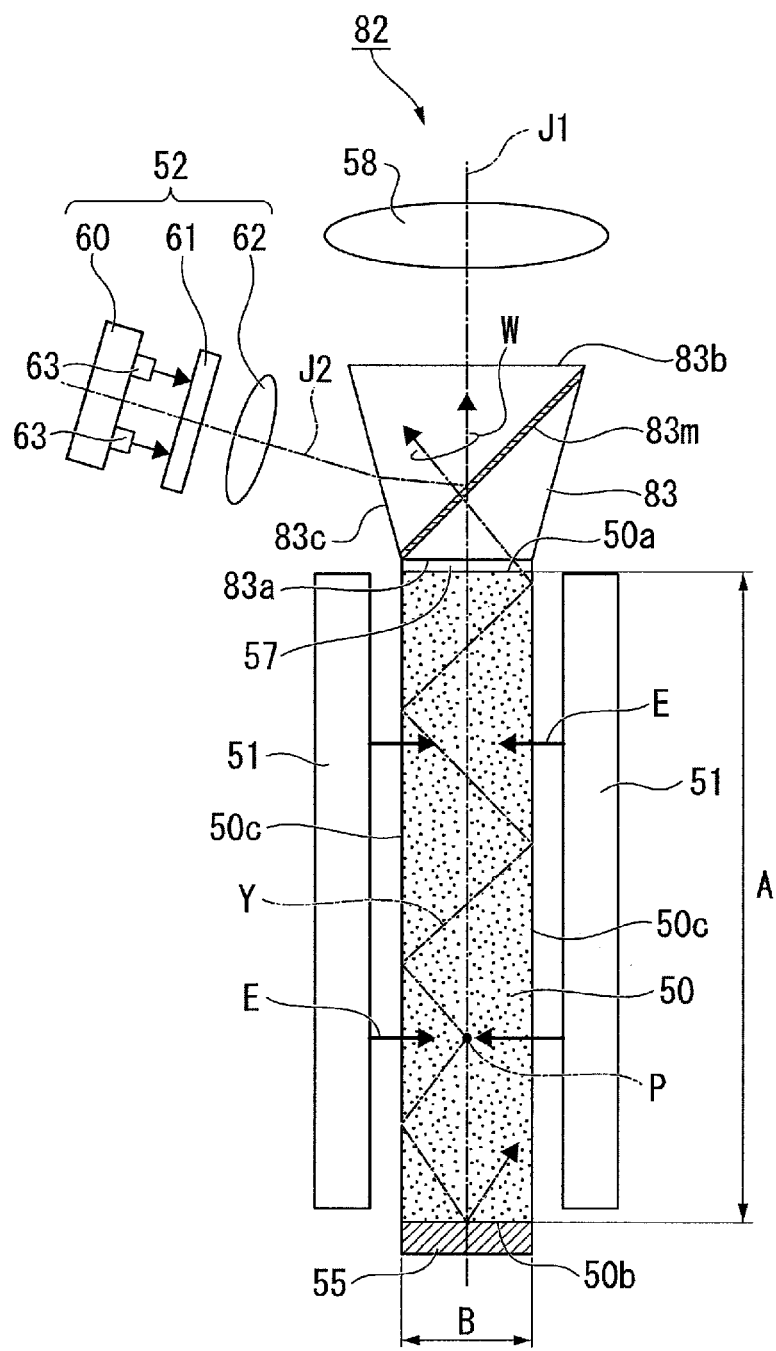
FIG. 5 is a schematic configuration diagram of a light source device according to a third embodiment.

FIG. 5 is a schematic configuration diagram of the light source device 82 according to the third embodiment.

In FIG. 5, the constituents common to those shown in FIG. 2 are denoted by the same reference numerals, and the description thereof will be omitted.

As shown in FIG. 5, the light source device 82 according to the third embodiment is provided with the wavelength conversion member 50, the first light source section 51, a color combining element 83, the second light source section 52, the mirror 55, the first dichroic mirror 57 and the collimator lens 58.

The color combining element 83 is disposed at the light exit side of the first end surface 50a of the wavelength conversion member 50. The color combining element 83 is fixed to the wavelength conversion member 50 with an optical adhesive (not shown) so that the first surface 83a is opposed to the first end surface 50a. Specifically, the color combining element 83 and the wavelength conversion member 50 have contact with each other via the optical adhesive, and no air gap (no air layer) is disposed between the color combining element 83 and the wavelength conversion member 50. The color combining element 83 is formed of a dichroic prism having a dichroic mirror 83m disposed inside. The dichroic mirror 83m has a property of transmitting the fluorescence Y emitted from the wavelength conversion member 50, and reflecting the blue light B emitted from the second light source section 52. Thus, the color combining element 83 generates the white composite light W obtained by combining the fluorescence Y and the blue light B with each other.

The color combining element 83 has a truncated quadrangular pyramid shape, and has a first surface 83a and a second surface 83b parallel to each other, and third surfaces 83c crossing the first surface 83a and the second surface 83b. The area of the second surface 83b forming a light exit end surface for the composite light W is larger than the area of the first surface 83a forming an end plane of incidence of light for the fluorescence Y. Thus, the fluorescence Y changes the angle to the direction parallel to the optical axis J1 every time the fluorescence Y is totally reflected by the side surface 83c while proceeding inside the color combining element 83 toward the second surface 83b. Therefore, the color combining element 83 has an angle conversion function of making the diffusion angle of the fluorescence Y in the second surface 83b smaller than the diffusion angle of the fluorescence Y in the first surface 83a. In other words, the color combining element 83 of the present embodiment also functions as the angle conversion element.

Meanwhile, the optical axis J2 of the second light source section 52 is tilted so that the blue light B is emitted without being blocked by the third surfaces 83c of the color combining element 83 after being reflected by the dichroic mirror 83m of the color combining element 83. Thus, the blue light B having been reflected by the dichroic mirror 83m and the fluorescence Y are combined with each other so as to proceed toward the same direction.

It is also possible to make the color combining element 83 shaped like a taper rod longer in the optical axis J1 than in FIG. 5, and at the same time, form the dichroic mirror 83m in only a part above the first surface 83a side of the color combining element 83. In that case, the light having been reflected by the dichroic mirror 83m proceeds toward the second surface 83b while being totally reflected inside the color combining element 83, and changes the angle to a direction parallel to the optical axis J1.

The rest of the configuration of the light source device 82 is substantially the same as in the first embodiment.

Also in the third embodiment, it is possible to obtain substantially the same advantages as in the first embodiment such as the advantage that it is possible to realize the light source device 82 with which the white light can be obtained with a compact configuration, and the advantage that it is possible to realize the light source device 82 small in etendue.

In particular in the case of the third embodiment, since the color combining element 83 also functions as the angle conversion element, the number of the components can be reduced, and at the same time further reduction in size of the light source device 82 can be achieved.

Fourth Embodiment

A fourth embodiment of the present disclosure will hereinafter be described using FIG. 6.

There is cited the example of the liquid crystal projector in the first embodiment, but in the fourth embodiment, the description will be presented citing an example of a projector equipped with a micromirror type light modulation device.

Figure 6:
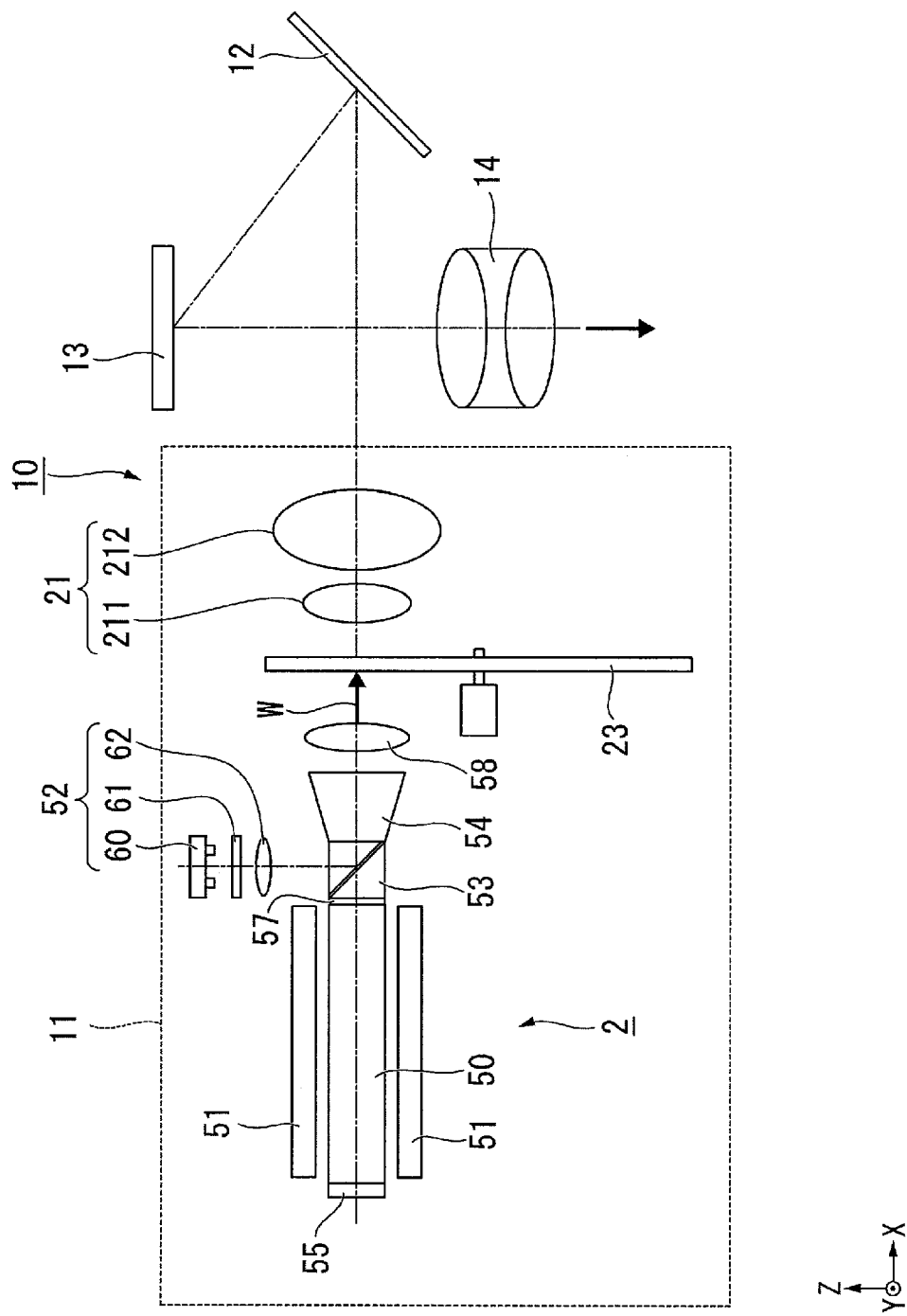
FIG. 6 is a schematic configuration diagram of a projector according to a fourth embodiment.

As shown in FIG. 6, the projector 10 according to the fourth embodiment is provided with an illumination device 11, a light guide optical system 12, a micromirror type light modulation device 13 and a projection optical device 14. The illumination device 11 is provided with the light source device 2, a color wheel 23 and a pickup optical system 21.

In the fourth embodiment, the light source device 2 according to the first embodiment is used as the light source device. It should be noted that it is also possible to use the light source device 72 according to the second embodiment or the light source device 82 according to the third embodiment instead of the light source device 2. Therefore, in the fourth embodiment, the description of the light source device 2 will be omitted.

The color wheel 23 has a configuration in which color filters corresponding respectively to three colors of red, green and blue are disposed over a rotatable substrate along the circumferential direction of a rotary shaft. By the composite light W emitted from the light source device 2 passing through the color wheel rotating at high speed, red light, green light and blue light are emitted from the color wheel 23 in a time-sharing manner.

In the case of the present embodiment, it is also possible to generate the red light, the green light and the blue light in a time-sharing manner using a configuration in which the first light source section 51 and the second light source section 52 are alternately made to emit light in a time-sharing manner, the yellow light emitted from the light source device 2 when the first light source section 51 emits light is temporally divided into the red light and the green light using the color wheel 23, and the blue light emitted from the light source device 2 when the second light source section 52 emits light is emitted in a different period from those of the red light and the green light although the configuration of the light source device 2 is substantially the same as in the first embodiment.

Alternatively, it is also possible to generate the red light, the green light and the blue light in a time-sharing manner using a configuration in which the first light source section 51 and the second light source section 52 are made to emit light at the same time, and the white light emitted from the light source device 2 is temporally divided using the color wheel 23.

When adopting the former method, it results in that the yellow light and the blue light fail to enter the color combining element 53 of the light source device 2 at the same time. Even in this case, the color combining element 53 emits the yellow light and the blue light switched at a rate which cannot be recognized by the human eyes toward the same direction, and therefore functions as an element for combining the yellow light and the blue light with each other.

The pickup optical system 21 is constituted by a first convex lens 211 and a second convex lens 212. The red light, the green light and the blue light emitted from the color wheel are transmitted to the light guide optical system 12 by the pickup optical system 21.

The light guide optical system 12 is formed of a reflecting mirror. The light guide optical system 12 reflects the red light, the green light and the blue light emitted from the light source device 2 to make the red light, the green light and the blue light enter the light modulation device 13 in a time-sharing manner.

As the micromirror type light modulation device 13, there is used, for example, a Digital Micromirror Device (DMD). The DMD has a configuration having a plurality of micromirrors arranged in a matrix. The DMD switches the tilt directions of the plurality of micromirrors to thereby switch the reflection direction of the incident light at high speed between the direction in which the incident light enters the projection optical device 14 and the direction in which the incident light fails to enter the projection optical device 14. As described above, the light modulation device 13 sequentially modulates the red light LR, the green light LG and the blue light LB having been emitted from the light source device 2 to generate a red image, a green image and a blue image.

The projection optical device 14 projects the red image, the green image and the blue image on a screen. The projection optical device 14 is constituted by, for example, a plurality of projection lenses.

The projector 10 according to the present embodiment is equipped with the light source device 2 according to the first embodiment, and is therefore excellent in light use efficiency, and at the same time, reduction in size can be achieved.

It should be noted that the scope of the present disclosure is not limited to the embodiments described above, but a variety of modifications can be provided thereto within the scope or the spirit of the present disclosure.

For example, there is cited the example in which the wavelength conversion member includes the phosphor for emitting the yellow fluorescence in the embodiments described above, it is also possible for the wavelength conversion member to include two types of phosphor constituted by a phosphor for emitting the green fluorescence and a phosphor for emitting the red fluorescence. In that case, it is possible for the two types of phosphor to be homogenously mixed inside the wavelength conversion member, or to be eccentrically located in separate areas.

There is cited the example in which the excitation light emitted from the first light source section is the blue light in the embodiments described above, but the excitation light can also be ultraviolet light. Further, there is cited the example in which the first light source section is formed of the LED, but the first light source section can also be formed of a semiconductor laser. On the contrary, there is cited the example in which the second light source section is formed of the semiconductor laser, but the second light source section can also be formed of an LED.

Although in the embodiments described above, there is cited the example of the light source device for emitting the white light, the present disclosure can also be applied to a light source device for emitting other colored light than the white light. For example, it is also possible to configure a light source device which is provided with a wavelength conversion member for emitting green fluorescence, and a second light source section for emitting red light, and emits yellow light. Even in that case, according to the present disclosure, it is possible to realize a compact configuration as the light source device for emitting the yellow light.

Further, the specific configurations such as the shape, the number, the arrangement, the material of each of the constituents constituting the light source device are not limited to those of the embodiments described above, but can arbitrarily be modified.

Although in the embodiments described above, there is provided the example of applying the dichroic prism as the color combining element, it is also possible to apply other optical members capable of performing color composition. For example, a scattering body having a light scattering structure inside can also be applied as the color combining element. As an example of the scattering body, there can be cited glass including scattering particles, an optical member including an anisotropic scattering layer, and so on.

Although in the first embodiment described above, there is described an example when applying the present disclosure to the transmissive liquid crystal projector, it is also possible to apply the present disclosure to a reflective projector. Here, "transmissive" denotes that the liquid crystal light valve including the liquid crystal panel and so on has a configuration of transmitting the light. The term "reflective" denotes that the liquid crystal light valve has a configuration of reflecting the light.

Although in the first embodiment described above, there is cited the example of the projector using three liquid crystal panels, the present disclosure can also be applied to a projector using one liquid crystal light valve alone or a projector using four or more liquid crystal light valves.

Although in the embodiments described above, there is described the example of installing the light source device according to the present disclosure in the projector, this is not a limitation. The light source device according to the present disclosure can also be applied to lighting equipment, a headlight of a vehicle, and so on.

What is claimed is:

1. A light source device comprising:
  a wavelength conversion member including at least a phosphor, and configured to convert excitation light in an excitation wavelength band into first light in a first wavelength band different from the excitation wavelength band;
  a first light source section configured to emit the excitation light;
  a second light source section configured to emit second light in a second wavelength band different from the first wavelength band; and
  a color combining element configured to combine the first light and the second light with each other to form composite light and emit the composite light, wherein
  the wavelength conversion member has a first end surface and a second end surface opposed to each other, and a side surface crossing the first end surface and the second end surface, the excitation light enters the wavelength conversion member from the side surface, and the first light is emitted from the first end surface, the color combining element has a first surface and a second surface opposed to each other, and a third surface crossing the first surface and the second surface, the first light emitted from the wavelength conversion member enters the color combining element from the first surface, the second light emitted from the second light source section enters the color combining element from the third surface, and the composite light is emitted from the second surface, and the color combining element has an angle conversion function of making a diffusion angle in the second surface smaller than a diffusion angle in the first surface.

2. The light source device according to claim 1, wherein the first light is yellow light, and the second light is blue light.

3. The light source device according to claim 1, further comprising:

an angle conversion element which is disposed at a light exit side of the wavelength conversion member, which includes an end plane of incidence of light and a light exit end surface, and which makes a diffusion angle in the light exit end surface smaller than a diffusion angle in the end plane of incidence of light.

4. The light source device according to claim 3, wherein the color combining element is disposed at the light exit side of the wavelength conversion member, and the angle conversion element is disposed at a light exit side of the color combining element.

5. The light source device according to claim 4, wherein the color combining element is fixed to the wavelength conversion member.

6. The light source device according to claim 3, wherein the angle conversion element is disposed at the light exit side of the wavelength conversion member, and the color combining element is disposed at a light exit side of the angle conversion element.

7. The light source device according to claim 6, wherein the color combining element is fixed to the angle conversion element.

8. The light source device according to claim 1, further comprising:

a mirror provided to the second end surface of the wavelength conversion member, and configured to reflect the first light.

9. The light source device according to claim 1, further comprising:

a first dichroic mirror disposed between the first end surface of the wavelength conversion member and the first surface of the color combining element, and configured to transmit the first light and reflect the excitation light.

10. The light source device according to claim 1, further comprising:

a second dichroic mirror provided to the side surface of the wavelength conversion member, and configured to transmit the excitation light and reflect the first light.

11. The light source device according to claim 1, wherein a dimension of the wavelength conversion member in a normal direction of the first end surface is longer than a dimension of the wavelength conversion member in a normal direction of the side surface.

12. The light source device according to claim 11, wherein the first light source section includes a light emitting diode.

13. The light source device according to claim 1, wherein the first light source section is disposed at a position opposed to the side surface of the wavelength conversion member.

14. The light source device according to claim 1, wherein the second light source section includes a semiconductor laser, a diffusing plate and a condenser lens.

15. A projector comprising:

the light source device according to claim 1;

a light modulation device configured to modulate light from the light source device in accordance with image information; and a projection optical device configured to project the light modulated by the light modulation device.

16. The light source device according to claim 1 wherein a dichroic mirror that transmits the first light and reflect the second light toward the second surface is disposed inside the color combining element.

17. The light source device according to claim 1 wherein the second light that is incident on the third surface is tilted to the third surface.

18. The light source device according to claim 17, further comprising:

a condenser lens on which the second light emitted by the second light source section is incident, wherein the second light is incident on the third surface via a condenser lens, and the condenser lens is tilted to the third surface.

* * * * *